United States Patent [19]

Kanamaru

[11] Patent Number: 4,630,134
[45] Date of Patent: Dec. 16, 1986

[54] SYSTEM FOR RECORDING AND REPRODUCING MULTIPLEX INFORMATION

[75] Inventor: Hitoshi Kanamaru, Saitama, Japan
[73] Assignee: Pioneer Electronic Corporation, Tokyo, Japan
[21] Appl. No.: 546,717
[22] Filed: Oct. 28, 1983
[30] Foreign Application Priority Data
  Oct. 30, 1982 [JP] Japan .............................. 57-191110
  Oct. 30, 1982 [JP] Japan .............................. 57-191112
[51] Int. Cl.⁴ .............................................. H04N 5/76
[52] U.S. Cl. ................................. 358/343; 360/19.1; 358/143; 381/3; 370/122
[58] Field of Search ............... 358/343, 330, 143, 144; 360/19.1, 30; 369/90; 381/2, 3; 370/122

[56] References Cited

U.S. PATENT DOCUMENTS

| | | | |
|---|---|---|---|
| 3,934,263 | 1/1976 | Palmer | 358/330 |
| 4,208,671 | 6/1980 | Ozawa | 358/330 |
| 4,353,090 | 10/1982 | Broadbent | 358/343 |
| 4,353,098 | 10/1982 | Heinz | 360/19.1 |
| 4,472,830 | 9/1984 | Nagai | 358/144 |
| 4,490,751 | 12/1984 | Kono | 360/19.1 |

Primary Examiner—Alan Faber
Attorney, Agent, or Firm—Sughrue, Mion, Zinn, Macpeak, and Seas

[57] ABSTRACT

A method for recording and reproducing multiplex information in which two subcarriers of the same frequency are modulated by two respective subchannel signals. The modulated signals are added to two main channel signals to produce two corresponding sum signals. Two main carriers of different frequencies are then modulated with the two sum signals. Information is recorded on a storage medium in response to the frequency-modulated signals. For reproduction of the recorded information, the main carriers are extracted and separated in frequency, and then detected by separate frequency detecting means. A selected one of two detected outputs from the frequency detecting means is supplied at a time to a common subchannel demodulating means.

17 Claims, 20 Drawing Figures

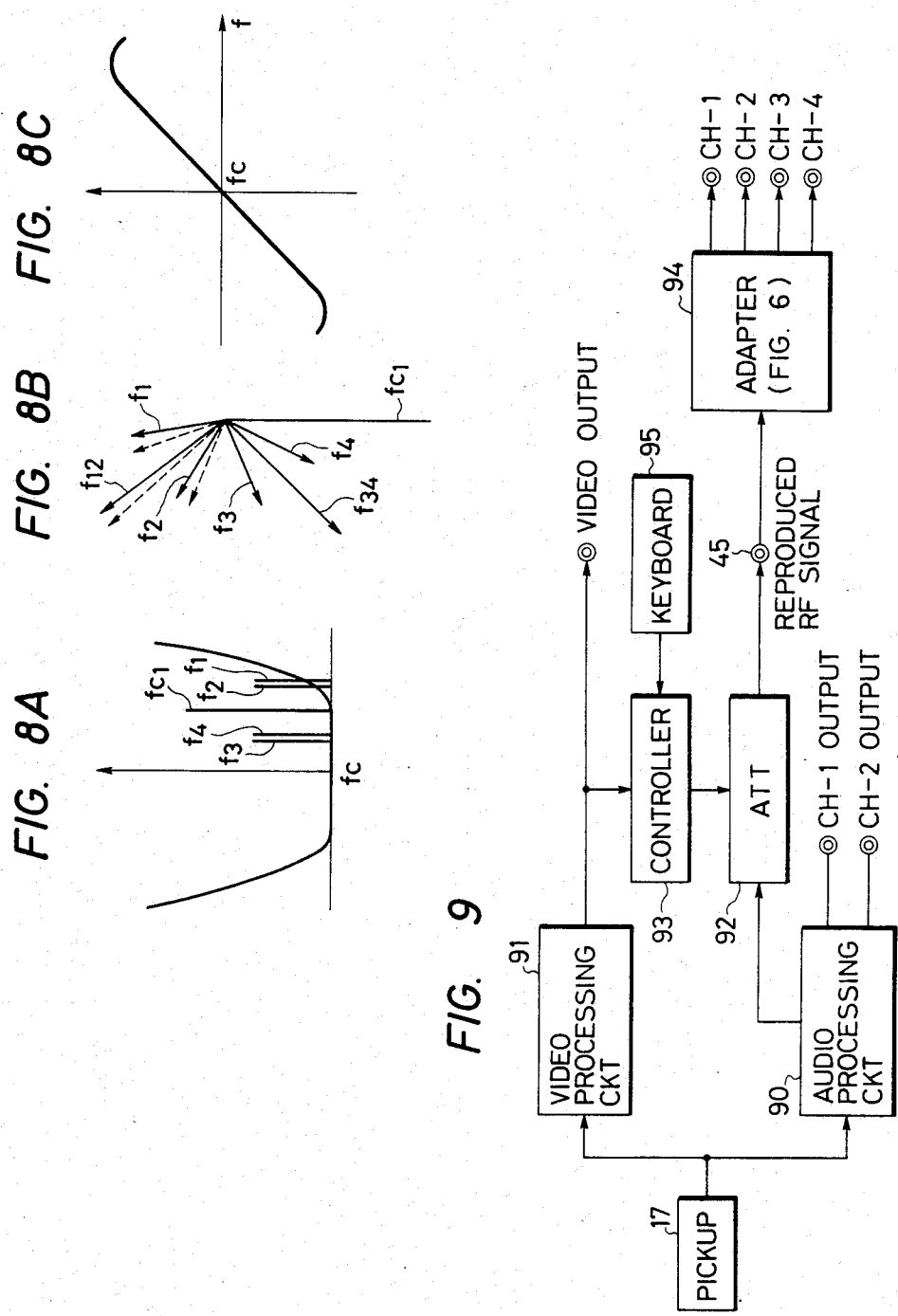

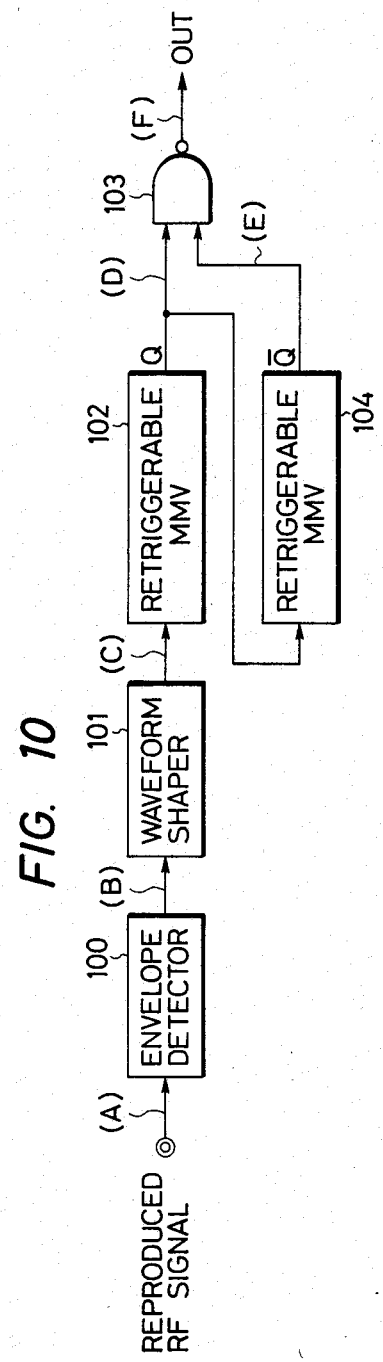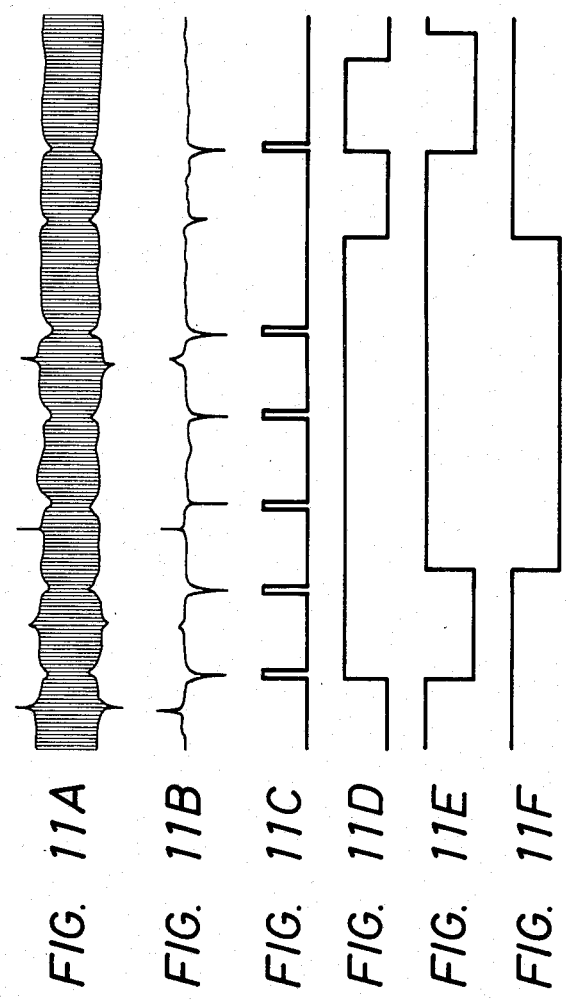

SYSTEM FOR RECORDING AND REPRODUCING MULTIPLEX INFORMATION

BACKGROUND OF THE INVENTION

The present invention relates to a system for recording and reproducing multiplex information. More particularly, the invention relates to a system for recording and reproducing multiplexed multichannel signals such as audio information in addition to video signals.

Video disks serving as information storage media have recorded thereon video signals and different information signals such as audio information signals. The video signals are frequency modulated. The audio signals are two-channel signals to allow for a stereophonic or bilingual program mode. The signals in each channel are recorded on the video disk by frequency modulating two independent audio carriers, together with the frequency-modulated video signals.

There is a demand for the multiplexing of other two-channel information, for example, in addition to the normal two-channel audio information. For reasons described later, there is no space available within the frequency spectrum recorded on a video disk for recording two additional channels. For multiplexing four-channel audio signals, furthermore, compatibility should be taken into account with existing recording and reproducing systems.

It is thus an object of the present invention to provide a multiplex information recording and reproducing method with which other recorded video information is not adversely affected, and which is compatible with existing recording and reproducing systems.

Another object of the present invention is to provide such a multiplex information recording and reproducing system having good reproducing characteristics.

SUMMARY OF THE INVENTION

According to the present invention, a method for recording and reproducing multiplex information includes steps of modulating two subcarriers of the same frequency with two respective subchannel signals, adding the modulated signals to two respective main channel signals, frequency modulating two main carriers having different frequencies with the two added signals, recording the frequency-modulated signals on a storage medium, separating and extracting signals at the frequencies of the main carriers for playback, detecting the latter signals with different frequency detector means, and selectively supplying one of the two detected outputs at a time to common subchannel demodulator means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 7A, 7B, 8A, 8B, and 8C are diagrams illustrating reproducing characteristics of a subchannel modulation system;

FIG. 9 is a block diagram showing signal transmission and reception between a reproducing device and a reproducing adapter;

FIG. 10 is a block diagram showing the manner in which an operational mode of the reproducer is determined in the reproducing adapter; and FIG. 11A–11F, taken together, are a timing diagram illustrating the waveforms of signals in the circuit shown in FIG. 10.

DESCRIPTION OF THE PREFERRED EMBODIMENTS

Figure 1:
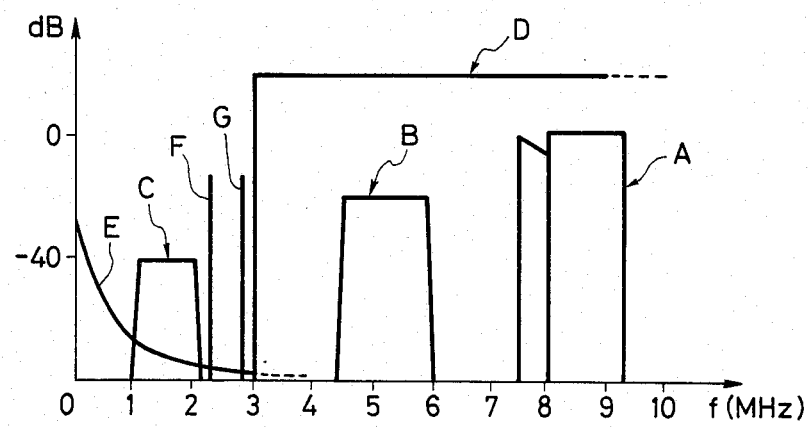
FIG. 1 is a diagram showing a spectrum of frequencies recorded on a video disk.

FIG. 1 shows a spectrum of frequencies recorded on a video disk serving as an information storage medium. The recorded information includes existing two-channel audio multiplex information. A color video signal, indicated by A in FIG. 1, is subjected to frequency band conversion such that a carrier of 8.1 MHz is frequency modulated, to yield a sync pulse level of 7.6 MHz and a white peak level of 9.3 MHz. Designated by B is a first sideband of a chrominance signal (3.58 MHz), and C is a second sideband thereof. Since the video signal is a wideband information signal, ranging from DC to 5.6 MHz, it has a modulation band D having a central frequency of 9.3 MHz (white peak)+8.2 MHz (pedestal level)÷2=8.75 MHz, and a width of 5.6 MHz (3.15–14.35 MHz). The noise spectrum peculiar to video disks is shown by the curve E in FIG. 1.

In accordance with the invention, a video disk is recorded with two audio carriers having frquencies of about 2.3 MHZ, indicated by F, and about 2.8 MHz, indicated by G. These carriers are frequency modulated for audio multiplexing with two-channel audio signals having a frequency band in the range of from about 40 Hz to 20 KHz.

If it is attempted to multiplex other two-channel information, for example, in addition to the above two-channel audio information, it is difficult to find space for a new audio carrier, as is apparent from the frequency spectrum of FIG. 1. If four-channel audio multiplexing were possible, compatibility with existing reproducing devices would have to be provided, as described above. Further, it is preferable not to allow the existing reproducing devices to suffer degraded characteristics in the playback mode.

With the above difficulties and in mind, the limitations present invention was made in order to successfully multiplex four-channel audio information.

Figure 2:
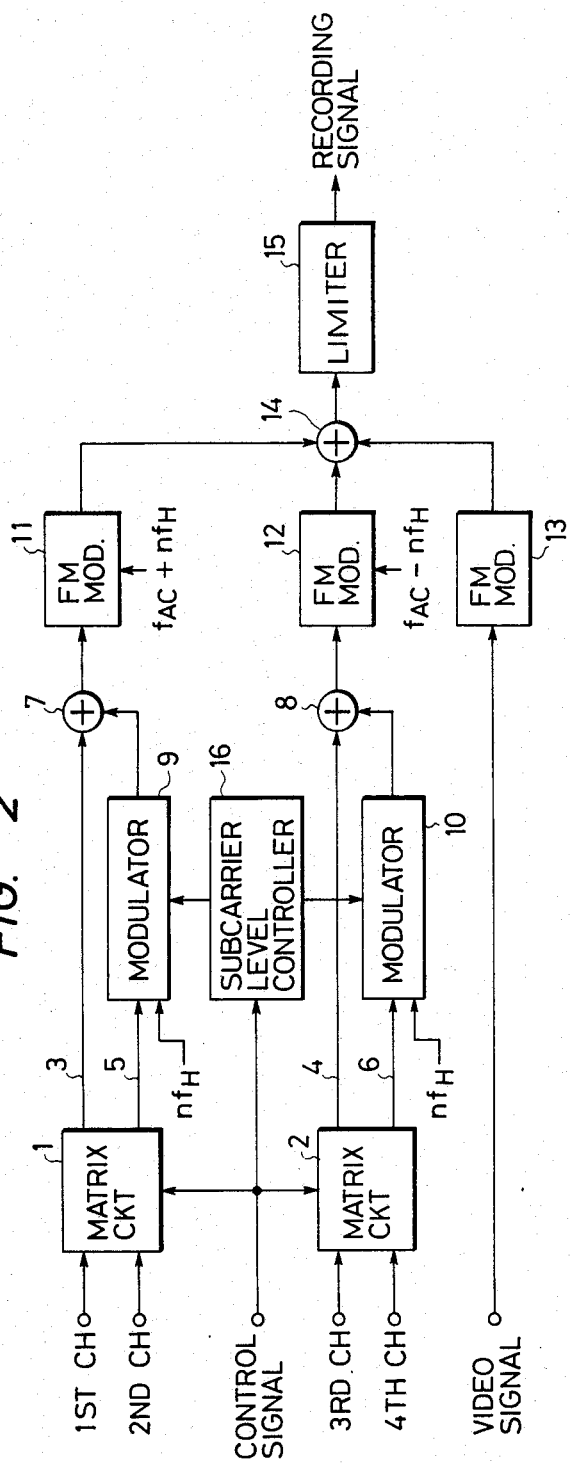
FIG. 2 is a block diagram of a multiplex information recording system.

FIG. 2 is a block diagram of a recording system employed for multiplexing four-channel audio information constructed in accordance with the invention. The recording system has first through fourth audio input channels. For example, a stereophonic signal in a first language (Japanese, for example) is applied through the first and second channels to a matrix circuit 1, and a sterephonic signal in a second language (English, for example) is applied through the third and fourth channels to a matrix circuit 2. It is also possible to apply mutually independent audio signals of four languages as four-channel information. Alternatively, stereophonic signals or bilingual signals may be applied to the first and third channels only for accommodating existing two-channel audio information. A control circuit (not shown) delivers a matrix control signal indicative of a two-stereo-signal mode (referred to as an "MPX stereo mode"), an independent one-language signal mode (referred to as an "MPX monaural mode"), and an existing signal mode (referred to as a "NO-MPX mode") using only the first and third channels, to the matrix circuits 1 and 2. Each of the matrix circuits 1 and 2 is responsive to the matrix control signal for generating added and subtracted outputs from the two input signals, or for delivering the two input signals without modification.

In the MPX stereo mode, the matrix circuits 1 and 2 each deliver a main channel signal (L+R), which is the sum of the input signals on lines 3 and 4, and also a subchannel signal (L−R), which is the difference between the signals on the lines 5 and 6. The subchannel signals (on the output lines 5 and 6) are applied to modulators 9 and 10 in which prescribed subcarrier signals are modulated, preferably frequency modulated. The modulated subchannel information is applied to mixers 7 and 8 where it is added to the main channel signals on the output lines 3 and 4. The sum signals are then fed to frequency modulators 11 and 12.

The main carrier frequencies used by the frequency modulators 11 and 12 are selected to be 2.3 MHz and 2.8 MHz, which are the same as the audio carrier frequencies for the existing video disks so as to thereby maintain the compatibility with existing reproducing systems. The frequency-modulated outputs from the frequency modulators 11 and 12 are mixed by a mixer 14 with video information frequency modulated by a frequency modulator 13, and then passed through a limiter 15 to generate a video disk recording signal.

The recording system of FIG. 2 also includes a subcarrier level controller 16 for controlling the subcarrier level with a control signal indicative of a recorded information program mode, the subcarrier level being used in playback for discriminating the matrix program mode.

Figure 3:
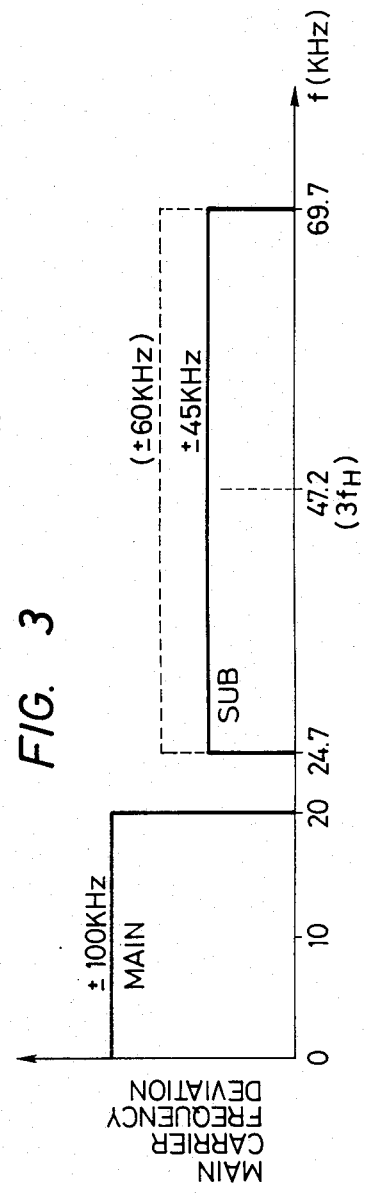
FIG. 3 is a diagrm showing a frequency spectrum at the time of multiplexing subchannels.

FIG. 3 shows the frequency spectrum of the input signals to the frequency modulators 11 and 12 shown in FIG. 3. The main channel signal (L+R) has a frequency band in a range of from about 40 Hz to 20 KHz. The subchannel signal (L−R), which is obtained by frequency modulating the subcarriers with the modulators 9 and 10, has a maximum deviation of ±15 KHz. The frequency of the subcarriers is selected to be $3f_H$, where $f_H$ is the horizontal synchronizing signal frequency. In the NTSC system, $3f_H$=47.25 KHz since $f_H$=15.734 KHz. In the PAL system, $3f_H$=36.88 KHz since $f_H$=15.625 KHz.

The frequency modulators 11 and 12 modulate the main channel signals to provide a maximum frequency deviation of ±100 KHz. The modulators 9 and 10 modulate the subchannel signals to provide a maximum carrier frequency deviation of ±45 KHz in the MPX monaural mode and ±60 KHz in the MPX stereo mode. The subcarrier level controller 16 for controlling the subcarrier level dependent on the recording program mode controls the subcarrier level to be 45% of the maximum in the MPX monaural mode, where the maximum refers to the 100% level (the level at which the main channel carrier is modulated by ±100 KHz), and to be 60% of the maximum in the MPX stereo mode. In the NO-MPX mode, the subcarrier level is set at zero as there is no subchannel signal.

A television multiplex broadcasting system will now be considered. In this system, a subcarrier is frequency modulated with the subchannel signal, while the main carrier is frequency modulated with the frequency-modulated subcarrier and the main channel signal, as illustrated in FIG. 2. Since receivers generally use an intercarrier system, it is necessary to select a subcarrier frequency $f_{SC}$ which results in no appreciable buzz beat, and hence the subcarrier frequency is selected to be $nf_H$ (n is a positive integer). As the buzz level becomes greater as the frequency is increased, the subcarrier frequency is selected to be $2f_H$.

A reproducing system for playing back video disks employs a split-carrier system rather than an intercarrier system, and hence in principle, there is no buzz beat generated. Accordingly, the subcarrier frequency is not limited to $nf_H$ for the purpose of suppressing buzz beat. However, the subcarrier frequency $f_{SC}$ should be limited to $nf_H$ for the following entirely different reasons:

In the video disk system, as shown in FIG. 2, the audio carrier and the video carrier are mixed and applied to the limiter, the output from which is used to form pits on a video disk for signal recording. If the signal reproduced from the disk is subjected to distortion, a beat due to the audio carrier may appear on the screen. The appearance of the beat is determined by the relationship between a main audio carrier frequency $f_{AC}$ and the horizontal synchronizing signal frequency $f_H$, and becomes least noticeable when these frequencies have the following relationship:

$$|f_{AC}-nf_H|=f_H/4. \tag{1}$$

Figure 4A:
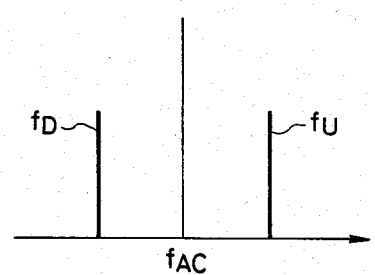
FIGS. 4A and 4B are diagrams showing the manner in which subcarrier frquencies are selected for subchannel frequency conversion.

That is, $f_{AC}$ should be offset by $f_H/4$ with respect to $nf_H$. Therefore, the main audio carrier frequencies are selected to be 146.25 $f_H$=2.301136 MHz and 178.75 $f_H$=2.812499 MHz, as indicated by F and G in FIG. 1. When the subchannel audio frequencies as described with reference to FIGS. 2 and 3 are multiplexed on the audio main carrier $f_{AC}$, a spectrum of upper and lower sidebands is produced as shown in FIG. 4A when no modulation is effected. The sideband signals due to the subchannel audio frequencies can cause beats to appear on the screen, similar to the main channel. It is thus preferable that the frequencies $f_U$ and $f_D$ of the sidebands have a $f_H/4$ offset with respect $nf_H$. Therefore, the following equations should be met:

$$|f_U-nf_H|=f_H/4 \text{ and} \tag{2}$$

$$|f_D-nf_H|=f_H/4. \tag{3}$$

Since $f_U=f_{AC}+f_{SC}$ and $\tag{4}$ $$f_D=f_{AC}-f_{SC}, \tag{5}$$

$f_{SC}$ is required to be $nf_H$, as is apparent from equations (1), (2) and (4), and (1), (3) and (5).

Where the audio multiplexing system of FIG. 2 is employed, the main channel will have a frequency deviation of ±100 KHz for 100% modultion, and the subchannel a frequency deviation of ±15 KHz for 100% modulation, with the modulated audio frequency band 10 KHz and with 60% (MPX stereo mode) of the 100% main channel level, that is, ±60 KHz being the subchannel frequency deviation. The necessary bandwidth, with the subcarrier being expressed by $nf_H$, can be roughly given, though highly complicated if computed in detail, as follows:

$$100 + nf_H + 15 + 10 + 60 \leq 250 \text{ (KHz)}.$$

The righthand side (250 KHz) in the above inequality is indicative of half of the difference (500 KHz) between the two audio main carriers of 2.3 MHz and 2.8 MHz, and represents the maximum, possible deviation of one audio main carrier. Therefore, the relationship $n \leq 4$ can be derived.

Figure 4B:
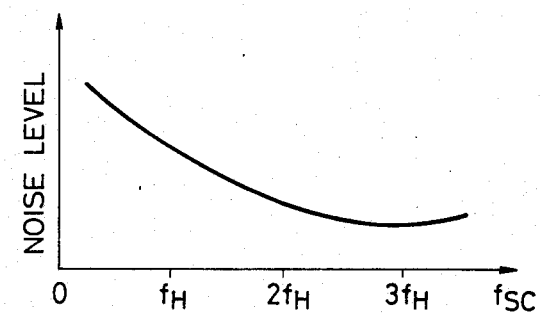

It is known that the noise level, when a subchannel carrier frequency ($f_{SC}$) is recorded on a video disk, is a minimum in the vicinity of $3f_H$ as shown in FIG. 4B. In view of this fact, and taking into account the limitaion of $n \leq 4$, the frequency $f_{SC}$ is selected to be $3f_H$. The foregoing frequency selection will minimize the influence of the audio beat in the reproduced image, eliminates interference between multiplexed audio inforamtion signal, and improves the S/N ratio.

A reproducing system for video disks includes a tangential servo system for correcting time base errors through detection of phase differences between reproduced color burst signals. During a vertical blanking period in which no color burst signal is present, no correct difference signal is produced, and the information detecting point is displaced at random in a tangential direction at a high frequency. At this time, the main carrier is modulated by such displacement. Since, however, the subcarrier directly modulated by the subchannel signal however is of a low frequency ($3f_H$), the amount of noise present in the reproduced signal is smaller than would be in the case of modulation employing a high-frequency carrier.

A reproducing system will now be described with reference to FIG. 5. From a reproduced RF (high frequency) signal outputted by a pickup 17 is separated by a low-pass filter 18 an audio multiplex information signal. (The video information reproducing system is omitted in FIG. 5.) The output from the low-pass filter 18 is applied to bandpass filters 19 and 20. The bandpass filter 19 passes the audio main carrier at 2.3 MHz, which is the center frequency of the filter, and adjacent frequencies, while the bandpass filters 20 has a center frequency of 2.8 MHz and passes frequencies adjacent thereto. Outputs from the bandpass filters 19 and 20 are applied to respective FM detectors 21 and 22 for FM detection.

The FM detectors 21 and 22 issue outputs which are selectively applied to a low-pass filter 24 and a bandpass filter 25. The output from the detector 22 is also fed to a low-pass filter 26. The low-pass filters 24 and 26 are capable of passing only audio band signals below 20 KHz. The bandpass filter 25 has a center frequency at the subcarrier frequency $3f_H$, and a bandwidth of ±22.5 KHz. The output from the bandpass filter 25 is detected by an FM detector 27. Outputs from the FM detector 27 and the low-pass filters 24 and 26 are delivered to a switching circuit 28, from which these three outputs are switched and selectively applied to two signal lines 30 and 31 in response to a control signal from a switch controller 29.

Holding capacitors 32 and 33, connected between the signal lines 30 and 31 and a reference potential point, are provided for compensating for signal dropout. The signals upon the lines 30 and 31 are applied through amplifiers 34 and 35, respectively, to a matrix circuit 36, from which the two inputs are issued as desired two-channel signals in response to a control signal from matrix controller 37.

A rectifier 38, a low-pass filter 39, and a level discriminator 40 are provided for discriminating the level of the output from the bandpass filter 25, that is, the subchannel carrier signal for mode determination. The level discriminator 40 determines a recording program mode (MPX stereo mode, MPX monaural mode, or NO-MPX mode) dependent on the subcarrier level and issues a signal indicative of the determined program mode. The mode signal from the level discriminator 40 is applied as a control signal for the switch controller 29 and the matrix controller 37. A reset signal generator 41 generates a reset signal when there is no RF signal in the reproduced audio information for thereby resetting the level discriminator 40 and to thus set the mode-indicative output.

The switching circuit 28 is composed of four switches $S_1$–$S_4$. The switch $S_1$ serves to switch on and off the output line 30 from the low-pass filter 24, and the switch $S_4$ serves to switch on and off the output line 31 from the low-pass filter 26. The switch $S_3$ connects and disconnects the detector 27 and the output line 31, and the switch $S_2$ connects and disconnects the detector 27 and the output line 30.

Dropout sensors 42–44 detect any dropout in the detecting signals in the inputs to the detectors 27, 21 and 22. The switch controller 29, in response to outputs from the dropout sensors 42–44, controls the switches $S_1$ through $S_4$.

Audio information extracted by the low-pass filter 18 is divided by the bandpass filters 19 and 20 into information in two channels, that is, components of the main carriers at 2.3 MHz and 2.8 MHz.

Reproduction of information recorded on a video disk in the MPX stereo mode will now be described. The switch 23 is controlled by the user. For example, when a first-language stereo mode using the first and second channels shown in FIG. 1 is selected, the switch 23 is controlled to select the output from the detector 21. The switching circuit 28 is then controlled such that the switches $S_1$ and $S_3$ are turned on and the switches $S_2$ and $S_4$ are turned off. The switching operation of the switching circuit 28 is automatically effected by the output from the level discriminator 40 which discriminates the level of the subcarrier signal. In this example, the switching circuit 28 is controlled by the output representative of the MPX stereo mode level from the level discriminator 40.

The main channel signal (L+R) of the stereo information in the first and second channels is extracted by the low-pass filter 24, and the subchannel signal (L−R) is extracted by the bandpass filter 25 and detected by the FM detector 27. The (L+R) signal is delivered through the switch $S_1$ over the line 30 to the matrix circuit 36, and the (L−R) signal is delivered through the switch $S_3$ over the line 31 to the matrix circuit 36. Since the MPX stereo mode is detected by the level discriminator 40 and the corresponding mode output is generated therefrom, the matrix controller 37 adds and subtracts the (L+R) and (L−R) signals to derive right and eft stereophonic channel signals for the first language.

When the second-language stereo mode using the third and fourth channels (FIG. 2) is selected, the switch 23 is controlled to select the output from the detector 23 in response to a control signal from an external control circuit (not illustrated) when the user actuates an external audio signal selection switch. The switching circuit 28 and the matrix circuit 36 operate in the same manner as that in which they operate in the first-language stereo mode. Therefore, the audio information having the main carrier of 2.8 MHz is selected by the switch 23, and the corresponding (L+R) signal and the (L−R) signal are delivered over the lines 30 and 31 to thus generate right and left stereophonic signals in the second language through matrix processing.

Reproduction of independent four-language signals recorded on the video disk in the respective first through four channels shown in FIG. 2 will now be described. For such reproduction, the signals in the respective channels are independent from each other, and if matrix processing were used, compatibility with existing reproducing devices which do not have a subchannel playback capability would be lost. Therefore, the channel signals are subjected to multiplex recording without matrix processing. The signal reproduction is in the MPX monaural mode, and the subcarrier level corresponds to 45%, which is detected by the level discriminator 40 to control the matrix circuit 36 so as not to effect addition and subtraction of the signals.

The switch 23 and the switching circuit 28 are switched by a control signal from the audio signal selection switch, actuated by the user, for selecting one of the first through fourth languages. For instance, the first language is selected by choosing the output from the detector 21 with the switch 23, in which case the switches S₁ and S₂ are turned on and the other switches turned off in the switching circuit 28. The other channels can similarly be selected.

The switching conditions of the switches are listed in the following table:

| Mode/Switch | Switch 23 | S1 | S2 | S3 | S4 |
|---|---|---|---|---|---|
| MPX stereo | DET21 output | on | off | on | off |
| MPX stereo | DET22 output | on | off | on | off |
| MPX mono (1st language) | DET21 output | on | on | off | off |
| MPX mono (2nd language) | DET21 output | off | on | on | off |
| MPX mono (3rd language) | DET22 output | on | on | off | off |
| MPX mono (4th language) | DET22 output | off | on | on | off |
| NO-MPX (stereo) | DET21 output | on | off | off | on |
| dropout | DET21/22 | off | off | off | off |

An instance when signal dropout occurs will now be described. Dropout is a phenomenon in which signals on recording tracks cannot be read out due to a scratch or dirt deposit or the like and continue for a relatively short time. Lack of information due to such a dropout is detected by the dropout sensors 42 through 44, and the switches S₁ through S₄ are then all turned off, as shown in the lowermost line of the above table, to enable the holding capacitors 32 and 33 to retain the outputs present immediately prior to the dropout, thus to compensate for such dropout. More specifically, in a normal reproducing condition, the on-off states of the switches S₁ through S₄ are determined according to the various modes. During a dropout interval, all of the switches S₁ through S₄ are turned off, irrespective of the mode selected. The amplifiers 34 and 35 have sufficiently large input impedances to prevent the capacitors 32 and 33 from being discharged. The switches S₁ through S₄ also remain turned off in a short period after a dropout interval for dropout compensation to prevent any noise present immediately after the dropout condition has ceased from being transmitted to the output terminals. To this end, the switch controller 29 is arranged to issue the control signal for an interval slightly longer than the dropout interval.

The structural features and advantages of the circuit shown in FIG. 5 will now be described.

As described, a single circuit system for reproducing and demodulating recorded information in two newly added subchannels is provided. The single circuit system is shared and switched on by means of the switch 23. This simplifies the construction of the reproducing system, reduces the cost thereof, and allows a higher degree of circuit integration. The common circuit equalizes reproducing characteristics, such as sound quality, in the two stereo signals (including different language signals), and the channel characteristics remain unchanged with time and temperature.

A second structural feature, related to the above first feature, is that the switch 23 for the common circuit system for controlling reproducing and demodulating the recorded information in the two newly added subchannels can be used not only for selecting between the subchannels, but also for simultaneously selecting between the main channels.

A straightforward switching construction for the common subcarrier reproducing and demodulating circuit system would include a switch disposed at an input stage of the reproducing and demodulating circuit system for effecting switching between two subchannels, and two main channels would be selected by the following switching circuit 28. However, such an arrangement would increase the number of switches used and result in complex switching control. Avoiding this difficulty, the number of switches used is reduced with the invention by employing the circuit arrangement of FIG. 5.

A third structural feature is the dropout compensation circuit, including the switches S₁ through S₄ and the dropout compensation capacitors 32 and 33 shared by the main channel and the subchannel for circuit simplification.

A fourth feature relates to the different subcarrier levels employed for the various recording program modes (MPX stereo mode, MPX monaural mode, and NO-MPX mode) which are recorded at the time of recording the four-channel signals. As described, the subcarrier levels are detected in the reproducing system for recording mode determination. This eliminates the need for inserting a special identification signal indicative of a recording mode at the time of recording.

Figure 5:
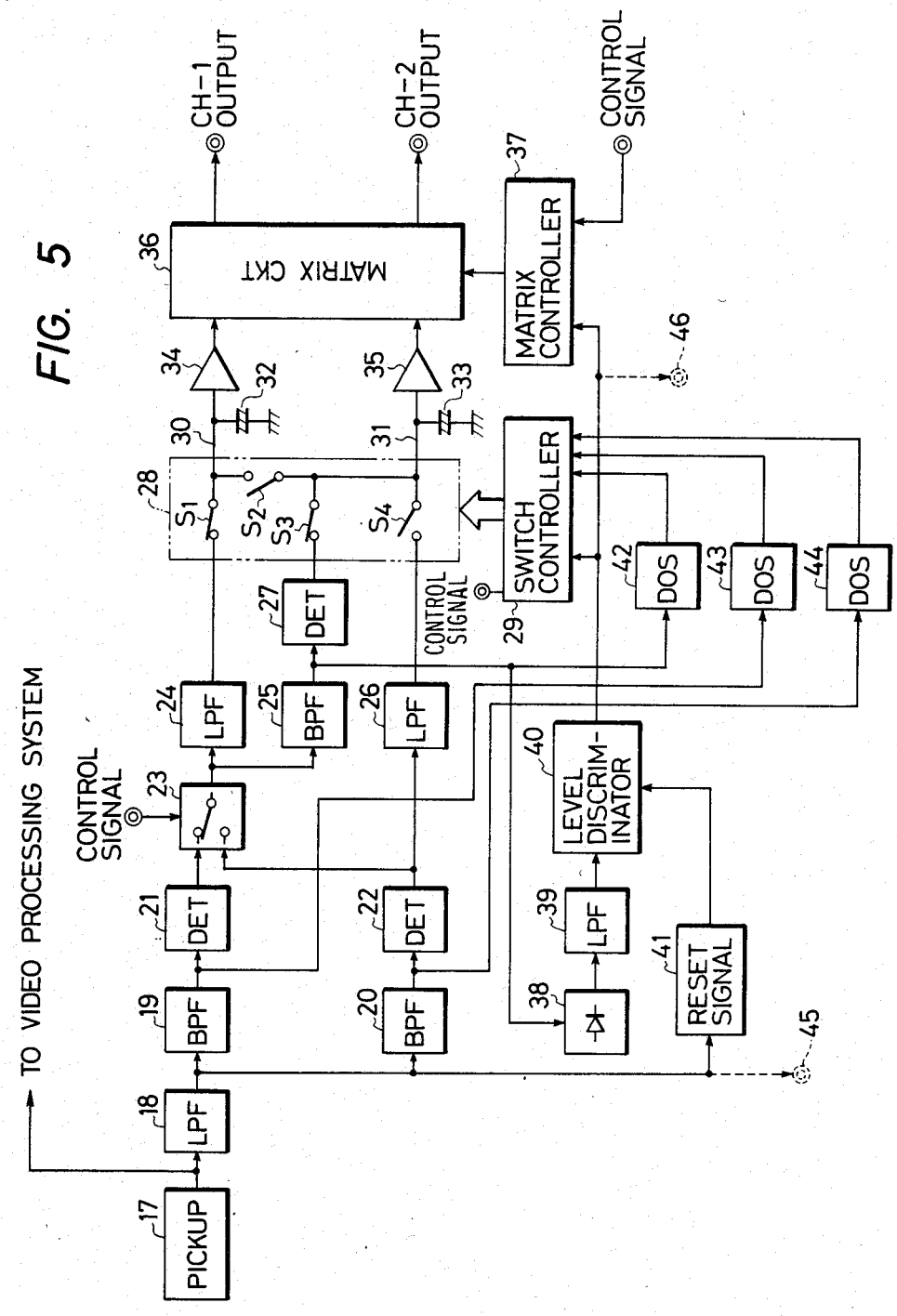
FIG. 5 is a block diagram of a system for reproducing information on a multiplex information storage medium.
Figure 6:
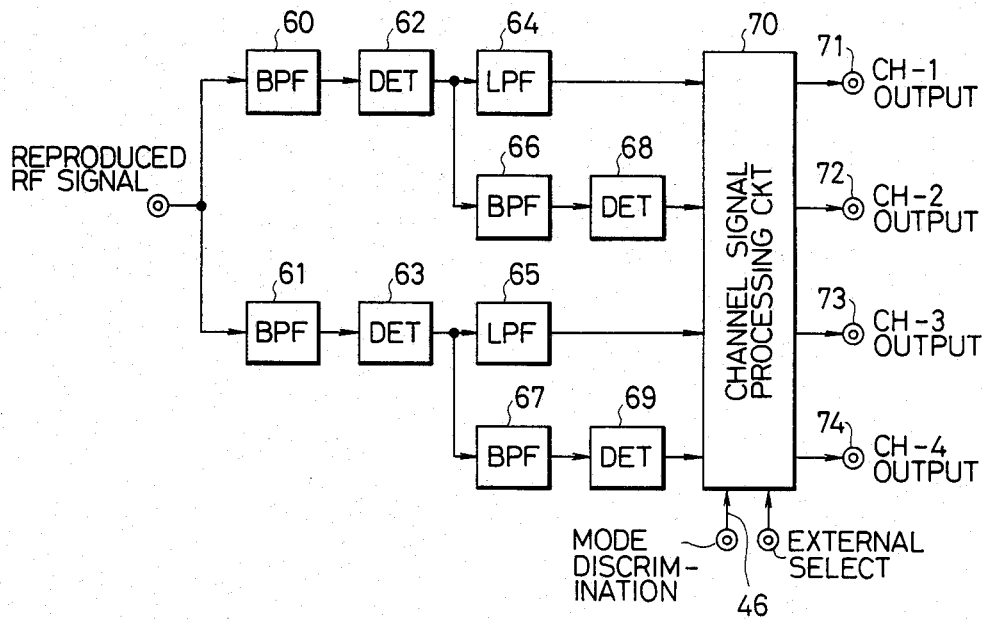
FIG. 6 is a block diagram of a reproducing adapter.

With the circuit arrangement of FIG. 5, two-channel signals are selected out of the four-channel multiplex audio information signals. A four-channel signal output adapter as shown in FIG. 6 may be added for reproducing all four-channel multiplex information.

More specifically, the reproduced RF signal from the low-pass filter 18 is brought in from the terminal 45 and the recording mode identification signal from the level discriminator 40 is brought in from the terminal 46 indicated in FIG. 5. The adapter, shown in FIG. 6, includes a pair of bandpass filters 60 and 61, receptive of the reproduced RF signals for selecting and extracting the main carriers at 2.3 MHz and 2.8 MHz. Outputs from the bandpass filters 60 and 61 are detected by FM detectors 62 and 63, and main channel signals are extracted by low-pass filters 64 and 65 from the outputs from the FM detectors 62 and 63. The detectors 62 and 63 provide outputs to bandpass filters 66 and 67, extracting signals in the vicinity of the specified subcarriers. The extracted signals are applied to detectors 68 and 69 for signal detection in the subchannels. The main channel and subchannel signals are applied to a channel signal processing circuit 70 in which channel signals are combined in response to the recording mode-indicating signal supplied from the output terminal 46. The four-channel outputs are then outputted to respective terminals 71 through 74. For example, desired signals may be present on the output termianls 71 and 73 (according to a user's command), and four language broadcasting signals may be delivered through all of the channels or signals may be delivered through particular channels. The channel signal processing circuit 70 is thus capable of selecting a desired combination of the output signals in response to an external select signal.

Instead of introducing the recording mode-indicating signal from the circuit of FIG. 5, all the four-channel signals may be directly applied to respective ones of the output terminals 71 through 74. As an alternative, an audio RF information signal may be supplied as an input to the adapter of FIG. 6 from a video disk player capable of reproducing signals in the ordinary two channels, that is, in the NO-MPX mode, and the signals reproduced from four-channel disks may be picked up from the adapter of FIG. 6, or the adapter may be arranged for reproducing the subchannels only.

With the foregoing construction, simultaneous reproduction of all of the channels in made possible while reducing the number components needed. Since only audio information signals are present on the connecting lines to the output terminal 45 (FIG. 5), there is substantially no radiation of signals which could interfere with external devices such as television and radio receivers.

Figure 7A:
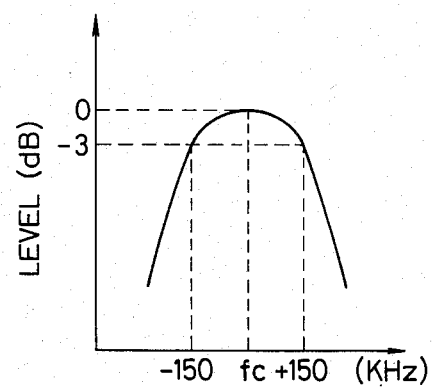
Figure 7B:
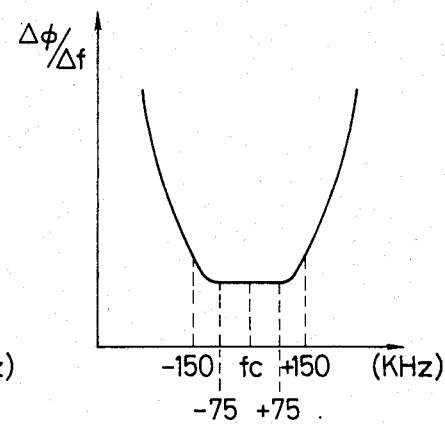

While in the foregoing embodiments two added subchannels to be multiplexed are frequency modulated for recording on an information storage disk, they may be amplitude modulated. In such a modification, the modulators 9 and 10 in the recording system shown in FIG. 2 are amplitude modulators, and the detectors 27, 68 and 69 in the reproducing system shown in FIGS. 5 and 6 are amplitude detectors.

in accordance with the invention, the subcarriers are subjected to amplitude or frequency modulation and the main carriers are subjected to frequency modulation in the multiplexing of the subchannels. Referring now to FIGS. 7 and 8, a procedure for determining which system, that is, the Fm-Am system or the FM-FM system, has the better characteristics for reproduction. The bandpass filters 19 and 20 in the reproducing system of FIG. 5 are assumed to have an amplitude characteristic as shown in FIG. 7A and a group delay characteristic as illustrated in FIG. 7B. In the case where the amplitude characteristic is required to be kept at a certain level, the group delay characteristic must have a narrow flat portion in a narrow frequency band of 7.5 KHz, as shown in FIG. 7B.

FIG. 8A shows a frequency spectrum taking into consideration upper and lower sidebands produced when the main carrier $f_c$ is shifted to $f_{cl}$ upon being frequency modulated. The frequency diagram is superimposed on the group delay characteristic of the bandpass filters. For clarity, FIG. 8A only shows primary sidebands in an FM-FM system. As an example of an FM-AM system, a frequency spectrum is shown in which a monaural signal is subjected to balanced modulation and then frequency modulation. Designated at $f_1$ and $f_2$ are upper sidebands, and at $f_3$ and $f_4$ lower sidebands. When the instantaneous frequency $f_{cl}$ of the main carrier $f_c$ reaches the upper limit of the flat poriton of the group delay characteristic, the upper sidebands $f_1$ and $f_2$ vary in phase and amplitude as shown in FIG. 8A. The frequency components are expressed as vectors in FIG. 8B, with the upper sidebands $f_1$ and $f_2$ being displaced from normal positions as indicated by the dotted lines. Therefor, a composite at $f_{12}$ of the upper sidebands $f_1$ and $f_2$ is displaced from its nomal position. A composite frequency vector (not shown) of all of the main carrier $f_{cl}$, the composite wave $f_{12}$, and a composite wave $f_{34}$ (of the lower sidebands $f_3$ and $f_4$) varies in phase and amplitude. Accordingly, the FM-AM system adversely affects the reproduced output to a large extent. The FM-FM system is thus advantageous in that amplitude variations in the subchannel carrier reproduced in the first detector are not affected.

The FM detectors 21 and 22 (FIG. 5) are assumed to have frequency detection characteristics as shown in FIG. 8C, which fail to exhibit linearity throughout all ranges. When the main channels are modulated to a large degree by passing through such detectors, they affect the amplitude characteristics of the subchannels more strongly in the FM-AM system than in the FM-FM system. Consequently, the FM-FM system provides better reproduction characteristics.

In the foregoing embodiment, the subcarrier levels in the subchannels are recorded at different values dependent on the mode. In another arrangement, an identification signal for identifying the recording mode may be encoded and recorded together with frame numbers indicative of playback track address information on a time multiplex basis in the video signal, such as during blanking periods such that the displayed video information is not affected. In such a modified arrangement, the rectifier 38, the low-pass filter 39, the level discriminator 40, and the reset signal generator 41 in the circuit shown in FIG. 5 can be dspensed with, and instead there can be provided a recording mode discriminator for generating a control signal in response to detection of the reording mode identification code signal from an output from a video system detector (not shown).

Where the adapter shown in FIG. 6 is employed, it is preferred that the adapter be held inoperative to prevent noise generation when the reproducing system operates in a special playback mode such as a still playback mode or a double-speed playback mode. Such adapter control can be effected by a circuit arrangement shown in FIG. 9.

As illustrated in FIG. 9, the reproduced RF signal from the pickup 17 is applied to an audio processing circuit 90 and a video processing circuit 91. The audio processing circuit 90 is of the same construction as that of the audio demodulating system illustrated in FIG. 5 for selecting and reproducing two-channel signal from among four-channel multiplex information. An output from the low-pass filter 18 (FIG. 5) in the audio processing circuit 90 is fed through an attenuator 92 to an output terminal 45 as a reproduced RF input to the adapter 94 of FIG. 6. A video output from the video processing circuit 91 is applied to a control circuit 93, which may be a microcomputer, which produces a control output for controlling the amount of attenuation produced by the attenuator 92. The control circuit 93 is responsive to various operational mode command signals from a keyboard 95 for controlling the operational modes of the reproducing device and also the amount of attenuation produced by the attenuator 92.

Where a video disk is used in which a signal indicative of a multiplex recording mode for video information is encoded and recorded as part of the video information, no reproduction is necessary in the NO-MPX mode if the adapter 94 is capable only of reproducing the subchannel signals. Therefore, in such a case, the control circuit 93 detects the code representing the NO-MPX mode from the video signal output, and controls the attenuator 92 to increase the amount of attenuation, that is, to provide a substantially infinite attenuation. This reduces or substantially eliminates the audio signal level at the input terminal of the adapter 94, thereby achieving the above object. For predetermined modes such as the special playback modes, it is preferable to mute the audio information. To effet this, the control circuit 93 determines how the keyboard 95 should be operated upon to control the attenuator 92 during the special playback modes to mute the audio signals.

In any playback mode in which the adapter 94 is likely to effect erroneous reproduction due to disturbed reproduced RF signal, the level of the reproduced RF signals fed to the adapter 94 is attenuated to stop adapter playback for thereby preventing an incorrect palyback operation. Since the demodulating operation of the adapter is controlled by the RF signal level at the input stage of the adapter, the reproducing device and the adapter may be connected by a single audio transmission line, with the result that the connectors used can be of low cost and there is no danger of spurious radiation. The adapter merely determines whether there is an RF signal present or not, and hence requires no special logic circuit and no microcomputer. Accordingly, the adapter is inexpensive to construct and reliable.

FIG. 10 is a block diagram of a circuit for muting audio signals in the adapter. A reproduced RF signal (A) applied to the adapter is detected by an envelope detector 100, which produces a detected output (B), converted by a waveform shaper 101 into a pulse waveform (C). The pulse signal (C) triggers a retriggerable monostable multivibrator 102, which issues a Q output (D) to an input of a two-input NAND gate 103 and to another retriggerable monostable multivibrator 104. A Q output (E) from the retriggerable monostable multivibrator 104 is applied to the other input terminal of the NAND gate 103. The NAND gate 103 produces an output (F) used as a muting signal.

FIGS. 11A through 11F show the waveforms of the signals in the circuit of FIG. 10, wherein the wavefoms of FIGS. 11A through 11F correspond to the signals (A) through (F), respectively, in the circuit of FIG. 10. When the reproducing device operates in a special mode other than the normal playback mode, such as the still playback mode or a double-speed playback mode, the aadapter does not reproduce the audio information in the same manner as in the normal playback mode. Specifically, the adapter operates in the still playback mode in the following manner:

In the still playback mode, the pickup operates to follow the same track at all times by being shifted across recording tracks at a constant interval of time. When the pickup is shifted across the tracks, the reproduced RF signal is eliminated. The reproduced RF signal disappears cyclically, with its waveform being as shown in FIG. 11A. The cyclic elimination of the RF signal is more distinct than dropouts and noise, as can be seen from its envelope shown in FIG. 11B. By shaping the envelope waveform with a waveform shaper 101 having a level comparison capability, a train of pulses can be generated, as shown in FIG. 11C, in synchronism with the jumping movement of the pickup across tracks. The Q output from the monostable multivibrator 102 becomes as shown by FIG. 11D by setting the pulse duration of the output from the monostable multivibrator 102 to be slightly greater than the pulse period shown in FIG. 11C. Since the monostable multivibrator 104 produces a Q output as shown in FIG. 11E, the NAND gate 103, supplied with the outputs (D) and (E) from the monostable multivibrators 102 and 104, produces an output as shown in FIG. 11F. Therefore, the output from the NAND gate 103 is low during still playback periods, and can serve as a muting signal. A pulse duration detector for issuing a pulse in response to a pulse having a predetermined pulse duration may be added to a front stage of the monostable multivibrator 102 for more accurate operation.

By makig the pulse duration of the output from the monostable multivibrator 102 slightly shorter than that from the monostable multivibrator 104, it is possible to mask a single dropout produced at a right-hand end of the waveforms of FIGS. 11A through 11F.

In playback modes at prescribed double or higher speeds in forward and reverse directions, a muting signal can be generated by suitably selecting the pulse duration of the outputs from the monostable multivibrators 102 and 104. The object of reducing undesired audio signals can be achieved by blocking or attenuating the reproduced output from the adapter with the muting signal.

With this arrangement, the muting signal can be produced only from the reproduced RF signal without receiving any playback mode information from the reproducing device, resulting in the various advantages described above with reference to FIG. 9.

Audio information may be multiplexed in four channels in the following modes:

(1) The first and third channels are in a stereo mode, and the second and fourth channels are in a stereo mode;

(2) The first and second channels are in a stereo mode, and the third and fourth channels are in a bilingual mode;

(3) The first and second channels are in a bilingual mode, and the third and fourth channels are in a stereo mode.

The system of the present invention is also applicable to existing four-channel systems, matrix four-channel systems, and SQ encoding four-channel systems where four-channel signals can be converted into four-channel signals.

Many recording and reproducing systems employ a noise reduction device such as a signal compressor and expander for improving characteristics of reproduced signal. The system of the present invention should preferably be provided with such a noise reduction device. It is preferred to incorporate a signal compressor and expander, as disclosed in co-pending U.S. Application Ser. No. 526,843 filed Aug. 26, 1983 assigned to the same assignee as this application.

While in the foregoing embodiment the present invention has been described with referece to a video disk, it is also applicable also to other types of information storage media, and also to transmission systems in which multiplex information is converted in frequency and transmitted and received through signal transmission channels.

With the arrangement of the present invention as described above, the following advantages are obtained:

(1) New audio channel signals can be transmitted using substantially the same frequency band as the main carrier band used for prior disk information storage systems. Since only one audio demodulating system need be added to the reproducing system, the circuit system is simplified, can be integrated, and is low in cost.

(2) The use of the common demodulating circuit equalizes reproduction characteristics, such as sound quality of two stereo signals, with the result that the characteristics of the channels remain free from any difference due to time and temperature variations.

(3) It is possible to record the four-channel audio information while retaining compatibility with existing systems, whereby the number of available recording methods for the audio information is increased. In addition, since no new main carrier is used in adding the channel signal, no interference with other recorded information is caused.

Although a certain preferred embodiment has been shown and described, it should be understood that many changes and modification may be made therein without departing from the scope of the appended claims.

What is claimed is:

1. A method for recording and reproducing multiplex information, comprising the steps of: for recording, modulating two subcarriers of the same frequency with two respective subchannel signals; adding the modulated signals to two main channel signals to produce two respective sum signals; frequency modulating two main carriers of different frequencies with the two sum signals; and recording information on a storage medium corresponding to the frequency-modulated signals; and, for reproduction, extracting and separating in frequency the main carriers, detecting the separated main carriers with separate frequency detecting means; and applying a selected one of two detected outputs from the frequency detecting means at a time to a common subchannel demodulating means.

2. A multiplex information recording method for multiplexing and recording a video signal and another multichannel signal, said method comprising the steps of:
providing first (3) and second (5) signals representing information to be recorded;
modulating a first carrier signal in accordance with said second signal to produce a first modulated signal;
combining said first signal and said first modulated signal to obtain a first combined signal;
frequency modulating a first main carrier signal in accordance with said first combined signal to obtain a first frequency modulated signal;
providing third (4) and fourth (6) signals representing information to be recorded;
modulating a second carrier signal in accordance with said fourth signal to produce a second modulated signal;
combining said third signal and said second modulated signal to obtain a second combined signal;
frequency modulating a second main carrier in accordance with said second combined signal to obtain a second frequency modulated signal;
combining said first and second frequency modulated signals and said video signal to obtain a recording signal; and
recording information on a storage medium in accordance with said recording signal.

3. A method as claimed in claim 2, wherein said first and second carrier signals have the same frequency.

4. A method according to claim 2, wherein said steps of modulating said first and second carrier signals comprise frequency modulating said first and second carrier signals.

5. A method according to claim 2, wherein said first and second main carrier signals have different frequencies.

6. A method according to claim 2, further comprising subcarrier level control means for controlling the level of said first and second subcarriers between at least a first level indicating that said first and second signals collectively represent a two-channel stereo signal and a second level indicating that said first and second signals represent information independent of one another.

7. A method according to claim 6, wherein said subcarrier level control means further controls the level of said first and second subcarriers to a third level indicating that said first and third signals collectively represent a two-channel stereo signal.

8. A method as claimed in claim 2, further comprising subcarrier level control means for controlling the level of said first and second subcarriers between at least a first level indicating that said first and second signals collectively represent a two-channel stereo signal and a second level indicating that said first and third signals collectively represent a two-channel stereo signal.

9. A method of reproducing multiplex information, represented by signals within a frequency band of interest, from a recording medium, comprising the steps of:
passing a pick-up output signal through first and second band pass filters (19 and 20) having first and second different center frequencies;
filtering outputs of said first and second band pass filters to pass only the portion of each of said outputs lying within said frequency band of interest;
detecting the subcarrier level of at least one of said band pass filter outputs;
selectively providing, at first and second terminals (30, 31) either (i) said first filtered signal in common at both of said first and second terminals, (ii) one each of said first and second filtered signals at said first and second terminals, respectively, or (iii) said second filtered signal in common at said first and second terminals, in accordance with the level of said subcarrier; and
processing said signals at said first and second terminals in accordance with said subcarrier level in order to obtain first and second output signals.

10. A multiplex information recording system for multiplexing and recording a video signal and another multichannel signal, said system comprising:
means for providing first (3) and second (5) signals representing information to be recorded;
first modulating means for modulating a first carrier signal in accordance with said second signal to produce a first modulated signal;
first combining means for combining said first signal and said first modulated signal to obtain a first combined signal;
first frequency modulating means for frequency modulating a first main carrier signal in accordance with said first combined signal to obtain a first frequency modulated signal;

means for providing third (4) and fourth (6) signals representing information to be recorded;

second modulating means for modulating a second carrier signal in accordance with said fourth signal to produce a second modulated signal;

second combining means for combining said third signal and said second modulated signal to obtain a second combined signal;

second frequency modulating means for frequency modulating a second main carrier in accordance with said second combined signal to obtain a second frequency modulated signal;

third combining means for combining said first and second frequency modulated signals and said video signal to obtain a recording signal; and means for recording information on a storage medium in accordance with said recording signal.

11. A system as claimed in claim 10, wherein said first and second carrier signals have the same frequency.

12. A system according to claim 10, wherein said first and second modulating means comprise frequency modulators for frequency modulating said first and second carrier signals, respectively.

13. A system according to claim 10, wherein said first and second main carrier signals have different frequencies.

14. A system according to claim 10, further comprising subcarrier level control means for controlling the level of said first and second subcarriers between at least a first level indicating that said first and second signals collectively represent a two-channel stereo signal and a second level indicating that said first and second signals represent information independent of one another.

15. A system according to claim 14, wherein said subcarrier level control means further controls the level of said first and second subcarriers to a third level indicating that said first and third signals collectively represent a two-channel stereo signal.

16. A system as claimed in claim 10, further comprising subcarrier level control means for controlling the level of said first and second subcarriers between at least a first level indicating that said first and second signals collectively represent a two-channel stereo signal and a second level indicating that said first and third signals collectively represent a two-channel stereo signal.

17. A system for reproducing multiplex information, represented by signals within a frequency band of interest, from a recording medium, said system comprising:

first and second band pass filters (19 and 20) having first and second different center frequencies for receiving and filtering a pick-up output signal;

filtering means for filtering outputs of said first and second band pass filters to pass only the portion of each of said outputs lying within said frequency band of interest;

detecting means for detecting the subcarrier level of at least one of said band pass filter outputs;

selection means for selectively providing, at first and second terminals (30, 31) either (i) said first filtered signal in common at both of said first and second terminals, (ii) one each of said first and second filtered signals at said first and second terminals, respectively, or (iii) said second filtered signal in common at said first and second terminals, in accordance with the level of said subcarrier; and processing means for processing said signals at said first and second terminals in accordance with said subcarrier level in order to obtain first and second output signals.

* * * * *